United States Patent
Fransioli

(10) Patent No.: US 8,005,489 B2
(45) Date of Patent: Aug. 23, 2011

(54) LOCATION BASED MESSAGING METHOD AND SYSTEM

(75) Inventor: Frank E. Fransioli, Conifer, CO (US)

(73) Assignee: Qwest Communications International, Inc., Denver, CO (US)

( * ) Notice: Subject to any disclaimer, the term of this patent is extended or adjusted under 35 U.S.C. 154(b) by 684 days.

(21) Appl. No.: 10/827,881

(22) Filed: Apr. 19, 2004

(65) Prior Publication Data

US 2004/0198396 A1   Oct. 7, 2004

Related U.S. Application Data

(63) Continuation of application No. 09/566,456, filed on May 8, 2000, now abandoned.

(51) Int. Cl.
*H04Q 1/00* (2006.01)
(52) U.S. Cl. ............... 455/456.3; 455/456.1; 455/456.2
(58) Field of Classification Search .................. 701/207, 701/211; 455/456.1, 456.3, 456.6, 457, 414.1, 455/414.3, 415, 445, 404.2, 421, 566; 340/988, 340/989, 990, 995.28, 995.1; 342/450, 454
See application file for complete search history.

(56) References Cited

U.S. PATENT DOCUMENTS

| | | | |
|---|---|---|---|
| 4,217,588 A | 8/1980 | Freeny, Jr. | |
| 4,882,724 A | 11/1989 | Vela et al. | |
| 5,305,195 A | 4/1994 | Murphy | |
| 5,539,395 A | 7/1996 | Buss et al. | |
| 5,712,899 A | 1/1998 | Pace, II | |
| 5,850,433 A | 12/1998 | Rondeau | |
| 6,026,305 A | 2/2000 | Salinger et al. | |
| 6,075,993 A | 6/2000 | Kawamoto | |
| 6,091,956 A * | 7/2000 | Hollenberg | 455/456.5 |
| 6,510,323 B1 * | 1/2003 | Stocker et al. | 455/456.6 |
| 6,714,785 B1 * | 3/2004 | Han | 455/440 |
| 2002/0077119 A1 * | 6/2002 | Fitch et al. | 455/456 |
| 2003/0060211 A1 * | 3/2003 | Chern et al. | 455/456 |

FOREIGN PATENT DOCUMENTS

WO  WO 01/86918 A2 * 11/2001

* cited by examiner

*Primary Examiner* — Jean A Gelin

(57) ABSTRACT

A method for providing location based messaging to a mobile user with a wireless portable receiving device includes sending a message to the portable device including content based on the location and the direction of travel of the portable device. In the method, the location and direction of travel of the portable device are determined, and a message is established. The message includes content based on the location and travel direction of the device.

16 Claims, 2 Drawing Sheets

LOCATION BASED MESSAGING METHOD AND SYSTEM

CROSS-REFERENCE TO RELATED APPLICATIONS

This application is a continuation of U.S. application Ser. No. 09/566,456 filed May 8, 2000 now abandoned.

TECHNICAL FIELD

The present invention relates to a method and system for providing location based messaging to a mobile user with a wireless portable receiving device.

BACKGROUND ART

The use of wireless communication networks has become widespread. In particular, the wireless telephone allows the mobile user to communicate with other users of the wireless telephone network and with users of the wire line telephone network. More recently, some wireless telephones support some basic interaction with the worldwide web.

Although existing wireless portable receiving devices are used for many applications that are commercially successful, wireless technology applications are still in their infancy. For example, an existing wireless device allows access to only general information. Available information is not localized or personalized to the specific mobile user that is using the wireless device.

For the foregoing reasons, there is a need for a method and system for providing location based messaging to a mobile user that provides localized and personalized information content in ways that improve over existing systems.

DISCLOSURE OF INVENTION

It is, therefore, an object of the present invention to provide a method and system for providing location based messaging to a mobile user with a wireless portable receiving device in which a message includes content based on the location and direction of travel of the portable device.

In carrying out the above object, a method of providing location based messaging to a mobile user with a wireless portable receiving device is provided. The portable device defines a location of the portable device, and defines a direction of travel of the portable device. The method comprises determining the location of the portable device, determining the direction of travel of the portable device, and establishing a message. The message includes content based on the location of the portable device and further based on the direction of travel of the portable device. The method further comprises sending the message to the portable device so that the user receives the location and direction of travel based content.

In one suitable implementation, the message is sent from a transmitter to the portable device, and sending the message further comprises establishing a voice channel between the transmitter and the portable device. The message is sent to the portable device as a voice message. In another suitable implementation, sending the message further comprises establishing a data channel between the transmitter and the portable device, and sending the message to the portable device as a data message.

In a preferred implementation, the method further comprises receiving a reply from the portable device. The reply includes a request for specific content. An additional message is established that includes specific content based on the request for specific content in the reply. The additional message is sent to the portable device so that the user receives the specific content requested in the reply. In one suitable implementation, the request for specific content may include a request for directions, and the additional message includes directions, for example, driving directions.

In one embodiment, determining the location of the portable device further comprises determining a plurality of boundaries to define a plurality of regions. The location of the portable device is determined based on the plurality of boundaries such that the portable device location indicates at least one of the plurality of regions.

Embodiments of the present invention are suitable for many different applications. For example, the message content may include a public service announcement, a local event schedule, a traffic report possibly including alternative route information, and/or a weather report, all advantageously based on the location of the portable device and further based on the direction of travel of the portable device. It is appreciated that basing the content on a direction of travel of the portable device improves the personalization of content from content based solely on device location. For example, a driver in a vehicle may desire information about products and services in the locality. However, the vehicle driver may specifically desire information about products and services that are most accessible, for example, that are on the way to where the driver is headed, or that are available immediately off of any upcoming near exits from the roadway.

In some embodiments, sending the message further comprises automatically sending the message. In other embodiments, sending the message further comprises receiving a connection request from the portable device, and sending the message after the connection request has been received. That is, the portable device may be of the always-on type, or may provide information upon request by the mobile user.

In one implementation, the method further comprises determining a content category. The message includes content based on the location of the portable device, the direction of travel of the portable device, and the content category.

Further, in carrying out the present invention, a system for providing location based messaging to a mobile user with a wireless portable receiving device is provided. The portable device defines a location of the portable device and defines a direction of travel of the portable device. The system includes a plurality of transmitters at different locations spaced apart from each other and defining a wireless network for the portable device. This system further includes a server including information classified based on location.

The server is configured to determine the location of the portable device, determine the direction of travel of the portable device, establish a message including content based on the location and direction of travel of the portable device, and determine at least one transmitter in a wireless network that is sufficiently close to the portable device to communicate therewith. The server is further configured to send the message from the at least one transmitter to the portable device so that the user receives location and direction of travel based content.

Advantageously, the server may be configured to send the message over a voice channel or a data channel. Further, the mobile user may send a reply and then receive additional messages including more specific content.

The server may determine the location of a portable device in a plurality of ways. For example, the location may be determined based on a plurality of regions defined by a plurality of boundaries such that the portable device location indicates at least one of the plurality of regions. Information for determining location may be sent to the server in a variety of ways. For example, the portable receiving device may include a global positioning system allowing the device to determine its own location from GPS satellites. The device may then send its location to the server, and the server may then return content based on the location and direction of travel for the portable device. Further, the device may determine its direction of travel based on sequential location readings, or the server may determine the direction of travel based on sequential location readings. Still further, implementations are contemplated wherein other network elements are operative to determine the location and/or direction of travel for the portable device and the present invention is not limited to any particular techniques for determining location and travel direction.

The advantages associated with embodiments of the present invention are numerous. For example, a preferred implementation delivers two-way, wireless communication where at least part of the information provided is location and travel direction dependent. For example, advertising may be delivered to the portable device based on location and direction of travel. Advantageously, the portable receiving device may be a portable phone, wireless modem, or any other known portable device for receiving information over a wireless link. Further, the portable device may be a hand-held device, or a device fixed within a vehicle.

The above object and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
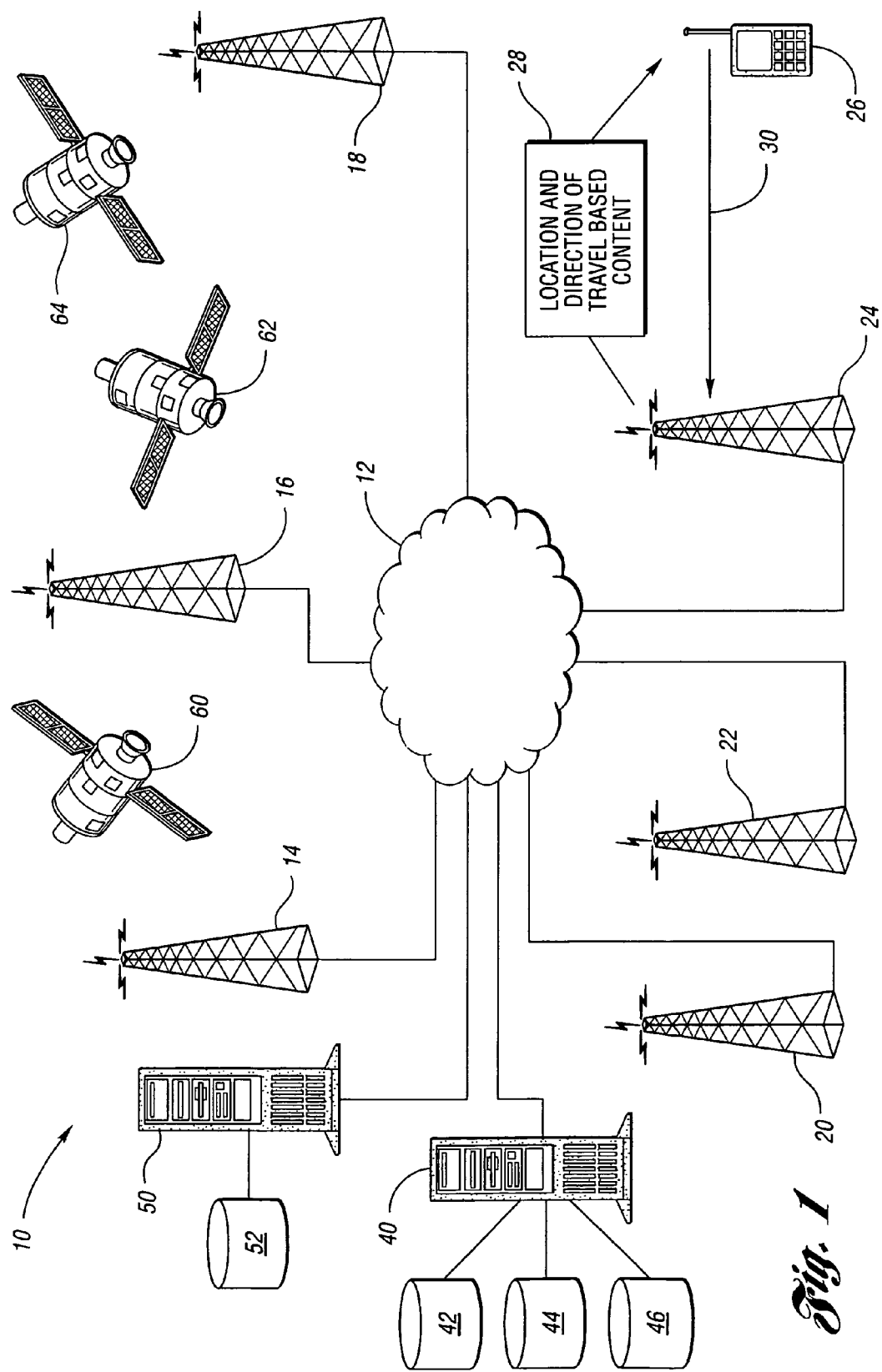
FIG. 1 is a system of the present invention, showing a server in communication with a wireless device over a wireless access network.

With reference to FIG. 1, a wireless access network is generally indicated at 10. The bulk of the wireless access network is indicated by cloud 12. It is appreciated that the network hardware may take many forms, for example, fiber optics, wireless links, and even satellite links, all within cloud 12. Users access network 10 when in proximity of a transmitter tower 14, 16, 18, 20, 22, 24. Further, the transmitter towers may be configured in a variety of ways as is appreciated by those skilled in the art. For example, a transmitter tower may serve a number of adjacent sectors, and overlap sectors from a nearby tower at the edges. As shown in FIG. 1, a wireless portable receiving device 26 is sufficiently close to transmitter 24 for wireless communication therewith.

In accordance with the present invention, messaging 28 includes content based on the location of the portable device and further based on the direction of travel of the portable device. The wireless communication is two-way communication as indicated by arrow 30. As the mobile user, and wireless portable receiving device 26, travel throughout the access area of the wireless access network 10, mobile device 26 moves into the different service areas of the different towers 14, 18, 20, 22, 24. As device 26 moves throughout the wireless network, content sent to device 26 includes content that is based on the location of device 26 in addition to being based on the direction of travel of device 26. For example, if a user in a vehicle traveling down a highway accesses the wireless network, content may be based on the mobile user location as well as the direction of travel so that information may be provided about upcoming places and events in the current locality.

The portable device 26 may receive information over a voice channel and/or a data channel. Further, the mobile user may reply from the portable device, and request more specific content. Additional messages 28 includes specific content based on the request for specific content in the mobile user's reply. For example, an initial message may indicate information about the current locality that is based in part on the direction of travel. The user may then request specific information about any of the information items previously sent. For example, a list of restaurants may be sent to the user, and the user may request specific directions to one or more of the restaurants.

The information in the messages comes from one or more servers 40, 50 on the wireless access network 10. As shown, server 40 is in communication with databases 42, 44, 46. Further, as shown, server 50 is in communication with database 52. The databases may contain a wide variety of information. In one example, Geographic Information System (GIS) data is contained in a database.

In accordance with the present invention, content sent to the user is based on location as well as direction of travel. The location may be a physical location such as a location determined with a global positioning system (GPS) within the device. The location may be a location with respect to known political or commercial entities such as state, county, and municipal boundaries as well as regions or commercial districts. That is, messaging may be based on location, including boundary information, and/or the direction of travel.

It is appreciated that the location and direction of travel may be determined by the mobile device itself, or may be determined by the network. In one example, GPS satellites 60, 62, 64 send GPS information to device 26. Device 26 then determines its location. Device 26 may determine its direction of travel based on sequential location readings. Device 26 may then send location and direction of travel information over the wireless access network to the information servers 40, 50. On the other hand, device 26 may only determine location, and the network may determine direction of travel based on consecutive location readings. Further, in the alternative, instead of using GPS, if the number of transmitters is sufficient, location and direction of travel information may be determined based on signal strengths between the mobile device and the various transmitters in the locality. Again, the network or the mobile device may determine the location and direction of travel.

Embodiments of the present invention have many uses. For example, the system may be utilized to sense the current location and travel direction, and calculate and retrieve directions to map the closest fixed provider of specific desired services or products. In one variation, the system provides specific instructions to avoid transient traffic delays as well as known detours. In another variation, message content is tied to proximity of the receiving device to specific venues or events such as concerts, sporting events, shopping centers or airports.

In one scenario, the receiving device is designated as a cellular or PCS handset. The method of invocation to receive local information or advertising based on the physical location and travel direction of the caller is via standard call invocation. In this method, the standard would be based on the service provider and might use a nomenclature of *82. Upon dialing this sequence, the caller would be connected to the service. The service would have that ability to note the location and travel direction of the caller and map such call into a logical geographical area, such as a town boundary. The service can be segmented into either broad advertisements or more specifically into specific help type categories like weather forecasts, traffic reports, local restaurants, car dealerships, etc. Contained within each segment can be advertising content.

In a second scenario, this method can apply to data with the newer wireless handsets or an interactive wireless data device integrated into a vehicle. In this variant, a user can invoke the data service and connect to multimedia content or a web portal. Based on the location and travel direction information retrieved, the user can view the same type of information, except instead of being audio, it will be interactive multimedia or Internet media. This allows the user to navigate within the system for weather or traffic information or other defined content. These devices may incorporate support from Global Position Satellites or may be tied to a cellular net to calculate the position and direction of travel of the receiving device as well as the location of the receiving device with respect to specific boundaries.

Figure 2:
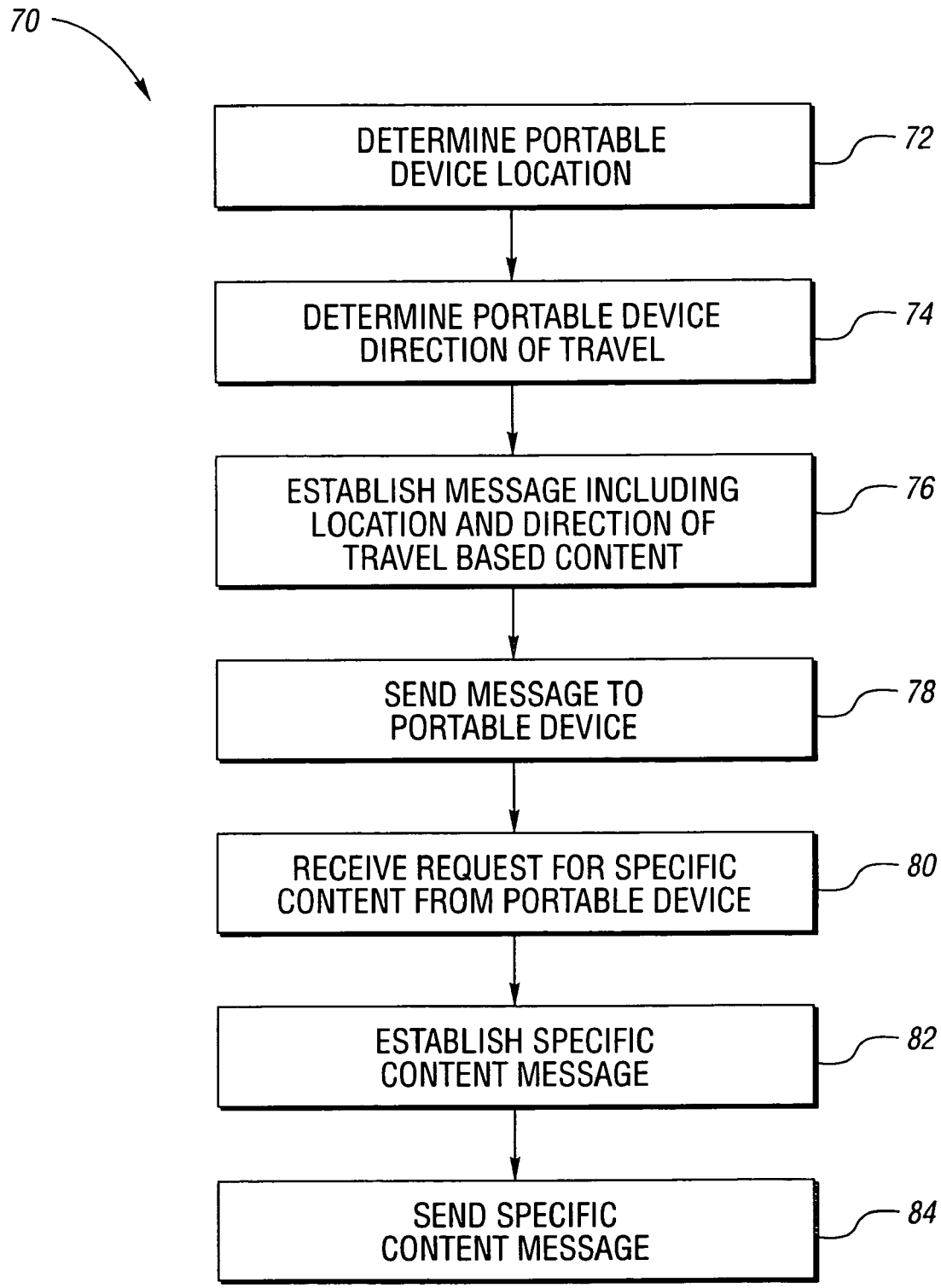
FIG. 2 is a block diagram illustrating a preferred method of the present invention.

With reference to FIG. 2, a preferred method of the present invention is generally indicated at 70. At block 72, portable device location is determined. At block 74, portable device direction of travel is determined. At block 76, a message is established that includes content based on location and direction of travel.

At block 78, the message is sent to the portable device. At block 80, a request for specific content is received from the portable device. At block 82, a specific content message is established. At block 84, the specific content message is sent to the portable device.

Advantageously, embodiments of the present invention have many suitable applications. For example, embodiments of the present invention may be suitable for wireless sports statistics. For example, the wireless portable device may be configured as an interactive statistics calculator. In a baseball game example, a mobile user could receive an update each inning and could view historic stats for each team and/or player. Updates from other recent or current games could be viewed with drill downs into area of interest. Similar applications are contemplated for all types of sports. Further, other entertainment venues such as concert information or festival information, including seating plans, may be included. For these types of applications, information about the performers or actors may be provided.

In yet another application for an embodiment of the present invention, traffic advisory information for temporary traffic routing or venue parking information may be provided to the portable device. Even further, is weather information that may be sent to the portable device.

In yet another implementation, portable devices may be used in accordance with the present invention to provide wireless guided tours. That is, the portable device may act as a tour guide, giving frequently updated information based on location and travel direction at a historic site or other tourable place of interest. The device may be configured with an integrated music player, such as a motion picture experts group (MPEG) player. Further, the device may act as a wireless billboard, displaying varying information to a traveling user. The above examples are just a few, and it is appreciated that many other suitable applications exist for embodiments of the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for providing location based messaging to a mobile user with a wireless portable receiving device, the portable device defining a location of the portable device and defining a direction of travel of the portable device, the method comprising:
    determining the location of the portable device at the portable device;
    determining the direction of travel of the portable device at the portable device;
    communicating the location and direction of travel to a service provider;
    receiving at the service provider a non-verbal request for location-based information from the portable receiving device;
    establishing a message including content based on the location of the portable device and further based on the direction of travel of the portable device;
    sending the message from the service provider to the portable device so that the user receives the content based on the location and direction of travel; and
    connecting the portable device with a web portal to provide the portable device with interactive Internet media pertaining to the location of the portable device.

2. The method of claim 1 wherein the message is sent from a transmitter to the portable device and wherein sending the message further comprises:
    establishing a voice channel between the transmitter and the portable device; and
    sending the message to the portable device as a voice message.

3. The method of claim 1 wherein the message is sent from a transmitter to the portable device and wherein sending the message further comprises:
    establishing a data channel between the transmitter and the portable device; and
    sending the message to the portable device as a data message.

4. The method of claim 1 further comprising:
    receiving a reply from the portable device, the reply including a request for specific content;
    establishing an additional message including specific content based on the request for specific content in the reply; and
    sending the additional message to the portable device so that the user receives the specific content requested in the reply.

5. The method of claim 4 wherein the request for specific content includes a request for directions, and wherein the additional message includes directions.

6. The method of claim 1 wherein determining the location of the portable device further comprises:
    determining a plurality of boundaries to define a plurality of regions; and
    determining the location of the portable device based on the plurality of boundaries such that the portable device location indicates at least one of the plurality of regions.

7. The method of claim 1 wherein the content includes an advertisement based on the location of the portable device and further based on the direction of travel of the portable device.

8. The method of claim 1 wherein the content includes a public service announcement based on the location of the portable device and further based on the direction of travel of the portable device.

9. The method of claim 1 wherein the content includes a local event schedule based on the location of the portable device and further based on the direction of travel of the portable device.

10. The method of claim 1 wherein the content includes a traffic report based on the location of the portable device and further based on the direction of travel of the portable device.

11. The method of claim 10 wherein the traffic report includes alternative route information.

12. The method of claim 1 wherein the content includes a weather report based on the location of the portable device and further based on the direction of travel of the portable device.

13. The method of claim 1 wherein sending the message further comprises:
automatically sending the message.

14. The method of claim 1 wherein sending the message further comprises:
receiving a connection request from the portable device; and sending the message after the connection request has been received.

15. The method of claim 1 further comprising: determining a content category, wherein the message includes content based on the location of the portable device, the direction of travel of the portable device, and the content category.

16. A system for providing location based messaging to a mobile user with a wireless portable receiving device, the portable device defining a location of the portable device and defining a direction of travel of the portable device, the system comprising a server configured to:
determine the location of the portable device at the portable device;
determine the direction of travel of the portable device at the portable device;
communicate the location and direction of travel to a service provider;
receive from the portable device a non-verbal request for location-based information from the portable receiving device;
establish a message including content based on the location of the portable device and further based on the direction of travel of the portable device;
send the message to the portable device so that the user receives the content based on the location and direction of travel; and
connect the portable device with a web portal to provide the portable device with interactive Internet media pertaining to the location of the portable device.

* * * * *